United States Patent [19]

Voegeli

[11] Patent Number: 4,589,041
[45] Date of Patent: May 13, 1986

[54] DIFFERENTIAL MAGNETORESISTIVE SENSOR FOR VERTICAL RECORDING

[75] Inventor: Otto Voegeli, Morgan Hill, Calif.

[73] Assignee: International Business Machines Corporation, Armonk, N.Y.

[21] Appl. No.: 412,656

[22] Filed: Aug. 30, 1982

[51] Int. Cl.[4] .................. G11B 5/127; G11B 5/33; G01R 33/02; G11C 19/08
[52] U.S. Cl. .................... 360/113; 360/115; 360/110; 338/32 R; 324/252; 365/8
[58] Field of Search .............. 360/113, 111, 115; 338/32 R; 324/252, 117 R, 127; 365/8, 158

[56] References Cited

U.S. PATENT DOCUMENTS

| | | | |
|---|---|---|---|
| 3,691,540 | 9/1972 | Almasi | 365/8 |
| 3,696,218 | 10/1972 | Uemura | 360/111 |
| 3,736,419 | 5/1973 | Almasi | 365/8 |
| 3,936,883 | 2/1976 | Heckle, Jr. | 360/110 |
| 3,975,772 | 8/1976 | Lin | 360/113 |
| 4,012,777 | 5/1977 | de Jonge | 360/77 |
| 4,012,781 | 5/1977 | Lin | 324/252 |
| 4,050,086 | 9/1977 | Harr | 360/113 |
| 4,432,028 | 2/1984 | Desserre et al. | 360/113 |

FOREIGN PATENT DOCUMENTS 0055432  1/1980  Japan .................. 360/113

OTHER PUBLICATIONS

IBM Technical Disclosure Bulletin, vol. 17, No. 11, p. 3437, Apr. 1975, "Resistance Matching for Coupled-Film MR Elements".

IBM Technical Disclosure Bulletin, vol. 15, No. 9, Feb. 1973, "Balanced Magnetic Head", by R. L. O'Day.

IBM Technical Disclosure Bulletin, vol. 17, No. 11, pp. 3478-3480, Apr. 1975, "Bal. Resistance MR Head Comp. Ther. and Pioz. EFF.".

*Primary Examiner*—A. J. Heinz
*Assistant Examiner*—Alfonso Garcia
*Attorney, Agent, or Firm*—R. E. Cummins; Otto Schmid, Jr.

[57] ABSTRACT

An MR sensor is disclosed in which a pair of thin film magnetoresistive strips are connected electrically in parallel between two terminals. Strips are spaced apart a distance which is small relative to the density of the stored data to be sensed. The strips are mutually-biased in opposite directions to corresponding points in the linear region of their respective curves by current from a constant source attached to one terminal. Since the resistance of each strip is equal, the current divides equally between the strips.

The sensor is positioned adjacent the magnetic surface containing stored data. Vertical components of the magnetic field (preferably vertically recorded data) influence the resistance of the strips differentially. When the sensor encounters a vertical flux transition, the output voltage varies to produce a unimodal type pulse.

8 Claims, 10 Drawing Figures

U.S. Patent    May 13, 1986    4,589,041
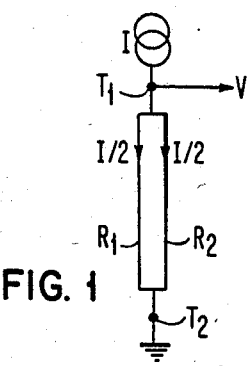
FIG. 1
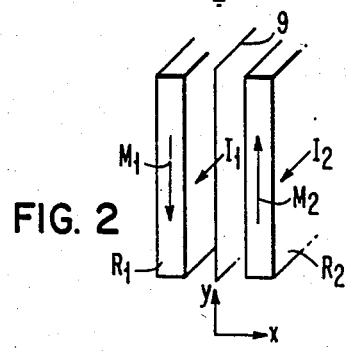
FIG. 2
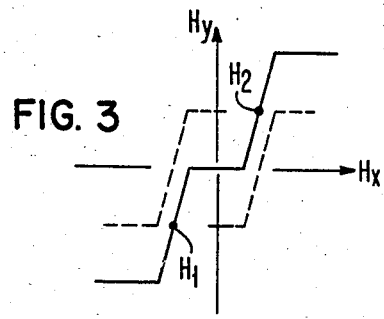
FIG. 3
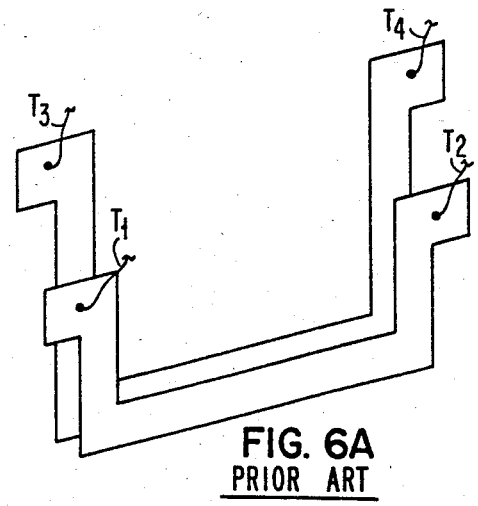
FIG. 6A
PRIOR ART
FIG. 6B
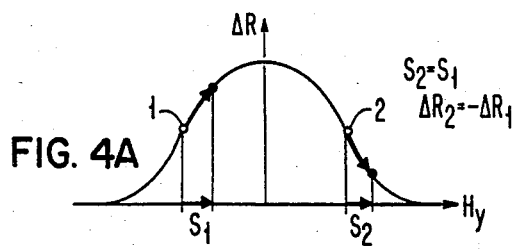
FIG. 4A
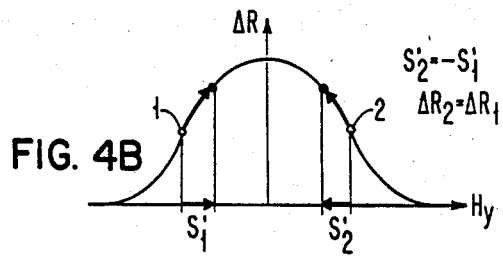
FIG. 4B
FIG. 5A
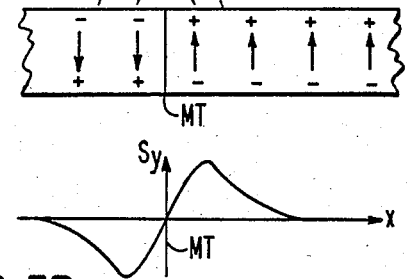
FIG. 5B
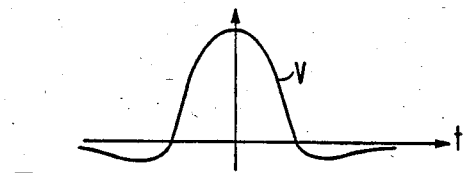
FIG. 5C

DIFFERENTIAL MAGNETORESISTIVE SENSOR FOR VERTICAL RECORDING

BACKGROUND OF THE INVENTION

1. Field of the Invention

This invention relates in general to magnetic transducers for reading information stored in a magnetic record and, in particular, to a differential magnetoresistive (MR) type magnetic sensor for reading data that has been stored in a magnetic record by vertical recording.

2. Description of the Prior Art

The prior art has disclosed various magnetic sensors for reading data from a magnetic surface by employing the magnetoresistive effect. The operation of the MR type transducer is based on the principle that the resistance of certain materials will change when subjected to a magnetic field. Output signals for such transducers are generated by supplying the magnetoresistive sensing element with a constant electrical current. The flux from the magnetic record that is seen by the sensing MR element will be reflected by a change in voltage that is proportional to the change in resistance of the material caused by the flux.

As discussed briefly in the IBM Technical Disclosure Bulletin, Vol. 15, No. 9, page 2680, MR elements exhibit a linear change in resistance for a given magnetic flux leakage over a relatively small range. The art, therefore, suggests providing a magnetic bias which will center the operation of the range at a point in the linear region. As discussed therein, a pair of separate MR elements are disposed on opposite sides of a centered bias strip which is made of a material such as titanium. Current through the center bias strip, biases each element such that the flux directions are opposite. A bridge current is provided which includes a pair of resistors and the differentially biased MR elements. Signals from the bridge are supplied to a differential amplifier which generates an output signal that is not affected by temperature fluctuations since the common mode rejection principle is operating. The output of the differential amplifier, therefore, reflects the value of the flux being sensed.

U.S. Pat. No. 3,860,965 also describes a magnetic sensor employing a pair of MR strips to obtain common mode rejection of thermal noise. However, in the arrangement disclosed, the separate bias conductor is eliminated and the pair of MR elements operate to mutually bias each other.

U.S. Pat. No. 3,879,760 also discloses a pair of mutually biased MR elements arranged to differentially sense a flux value. In accordance with the disclosed teaching, the MR strips are deposited with their induced easy axes plus and minus 45° respectively relative to their longitudinal axes.

The differential MR devices disclosed in the prior art, including the art discussed above, are basically all four terminal devices in that each end of each strip is connected to a separate terminal. The need for separate connections in thin film technology implementations of MR strips greatly increases the fabrication complexities since several lithographic fabrication steps are required to produce the necessary electrical connections to the two MR elements. Also, since separate fabrication steps are required for each MR element, it is difficult to produce them with identical material characteristics, as required for common mode rejection of thermal noise. Furthermore, alignment problems may occur between the two strips. Finally, it has proven difficult to fabricate the two strips in close proximity while reliably maintaining electrical insulation between them, as is imperative with any such four-terminal device.

SUMMARY OF THE INVENTION

The present invention eliminates these prior art problems by providing an MR sensor having a pair of mutually biased MR strips which are connected in parallel between two terminals such that signal addition is internal to the device.

While the device of this invention is not encumbered by the problems with the prior art devices, it also has an entirely different objective of operation, and correspondingly, different dimensional characteristics. With the prior art devices, it was the objective to obtain common mode rejection of undesirable noise inputs, such as thermal noise. To accomplish an adequate degree of such rejection, it was imperative that the two elements were located in as close proximity to each other as possible while still maintaining electrical insulation between the two elements. Both elements were, hence, sensing a substantially identical field from the magnetic record, but because of their opposite bias conditions, experienced opposite changes of resistance, that is, the resistance of one MR element would increase while the resistance of the other element would decrease. In order to derive some useful electrical signal from such a condition required the use of an electrical bridge circuit or the use of a differential amplifier and, hence, a four-terminal arrangement of the MR sensor configuration.

With the sensor of the present invention, it is not the objective to provide common mode rejection of thermal noise, but instead, to provide a magnetoresistive sensor which produces a unimodal output signal from a vertical magnetic record. For this purpose, the two MR sensors of this invention are to produce an electrical output signal which is proportional to the difference in the vertical field component at the two sensor locations. The differential sensor of this invention is, hence, of primary interest for use with vertically recorded data, for it is only above a vertical magnetic transition that there exists a large difference in the vertical field. As this difference in the vertical field vanishes as the separation between the two MR elements approaches zero, the two magnetoresistive strips of this invention need to be separated by an amount substantially larger than with the prior art configuration. The differential signal addition is internal to the two terminal device of this invention, so that with a vertical transition located between the two sensor strips, the resistance change between the terminal is maximum. The corresponding output voltage is unimodal, that is, for sequential vertical transitions, the output voltage is alternately positive and negative. A uniform field input to the two sensors produces no change of net resistance between the two terminals and, therefore, it is not necessary to provide magnetic shields adjacent to the differential sensor as is required with the prior art MR sensors to achieve adequate spatial resolution. As a consequence, fabrication of the differential sensor is additionally simplified.

The improved differential MR sensor conceptually comprises a pair of parallel MR strips which are separated by a distance that is relatively small compared to the spacing of vertically recorded bits which are to be sensed. Electrically, the sensor is a two terminal device with the two MR strips connected in parallel between the two terminals. The current flows from the input terminal to the output terminal such that the currents $I_1$ and $I_2$ in each element respectively are equal. These currents produce a transverse magnetic field which provides a mutual biasing effect such as to rotate the magnetization from the longitudinal easy axes in opposite directions in the strips. As a result, a different resistive response is achieved in each element in response to the same flux value which results in no change in net resistance and, hence, no change in the output signal. On the other hand, when sensing the dipolar flux configuration from a vertical transition, both MR elements change their resistance in the same sense and produce a maximum change of net resistance between the two terminals of the device. One advantage is that a unimodal pulse, which is common in the sensing of transitions of horizontally recorded data by conventional $d\phi/dt$ transducers, is obtained by providing relative motion between the MR sensor and the transition in a direction normal to the plane which separates the elements.

It is, therefore, an object of the present invention to provide an improved MR sensor for vertical recorded data.

Another object of the present invention is to provide an improved MR sensor for sensing binary data which has been stored on a magnetic surface by vertical recording.

A further object of the present invention is to provide an MR sensor for vertically recorded data which produces a unimodal output signal.

A still further object of the present invention is to provide an MR sensor having simple fabrication requirements and spatial resolution without the use of magnetic shields.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a schematic illustration of the electrical circuit of the two terminal differential MR sensor of the present invention;

FIG. 2 is a diagrammatic illustration of the physical arrangement of the MR sensor of the present invention;

FIG. 3 shows the magnetic field configuration produced by the sense currents in the two sensor strips, illustrating the mutual biasing conditions of the MR strip arrangement shown in FIG. 2;

FIG. 4A is a magnetoresistive response graph showing the respective operating points of the two mutually biased sensor strips and their respective responses to a uniform input field;

FIG. 4B is a curve similar to FIG. 4A showing the responses of the two sensor strips when subjected to input fields of opposite polarity as with a vertical transition centered under the two sensor strips;

FIG. 5A is a diagrammatic sketch of the sensor and a vertically recorded transition;

FIG. 5B is a plot of the vertical component $S_y$ of the stray flux pattern shown in FIG. 5A as the transition is moved relative to one element of the sensor;

FIG. 5C shows the waveform of the output voltage V when the transition is moved in the X direction passing the sensor location.

FIGS. 6A and 6B are perspective views illustrating respectively the thin film layers and terminals for the prior art four-terminal sensor and a two-terminal sensor embodying the present invention.

DESCRIPTION OF THE PREFERRED EMBODIMENT

The equivalent electrical circuit of the MR sensor of the present invention is shown in the schematic illustration of FIG. 1 in which $R_1$ represents one magnetoresistive strip, $R_2$ the other magnetoresistive strip, and I a current source. As shown in FIG. 1, the strips $R_1$ and $R_2$ are attached at either ends to terminals $T_1$ and $T_2$. Terminal $T_1$ is connected to the current source I, while terminal $T_2$ is connected to ground. Magnetoresistive strips $R_1$ and $R_2$ are intended to have equal resistances in their operative states so as to cause the current from source I to divide equally between each strip.

As shown in FIG. 2, current I divides into currents $I_1$ and $I_2$, with $I_1$ flowing through strip $R_1$ and $I_2$ flowing through strip $R_2$. Strips $R_1$ and $R_2$, as shown in FIG. 2, are separated by a spacer layer 9 which separates the two strips by a distance smaller than the spacing between vertically recorded data bits. The strips are biased by the magnetic fields from currents $I_1$ and $I_2$ such that the magnetization in the two strips rotates in an opposite sense, producing the transverse magnetization components $M_1$ and $M_2$ that are in opposite directions to each other. The manner in which magnetic strips mutually biases each other is known in the art, any any of the prior art designs may be employed.

This self-biasing effect is more readily seen in FIG. 3 which shows about the two sensor strips the magnetic field configuration produced by the sense currents $I_1$ and $I_2$. As shown in FIG. 3, strips $R_1$ and $R_2$ are biased in opposite transverse directions by the average effective fields $H_1$ and $H_2$ respectively.

The sensing operation may be better understood in connection with FIGS. 4A and 4B which are curves illustrating the change in resistance $\Delta R$ on a vertical scale in response to sensing vertical components of an external magnetic field, the strengths of which are indicated on the horizontal axis, and the direction plus or minus of the field being indicated by the direction along the horizontal X-axis.

FIG. 4A illustrates the effect of the change in resistance $R_1$ and $R_2$ when both strips are subject to a uniform vertical field, thus sensing the flux inputs $S_1$ and $S_2$ which are in the positive direction and of the same magnitude. As shown, $R_1$ increases from point 1 while $R_2$ decreases from point 2. Assuming a linear relationship along both sides of the curve, $\Delta R_1$ is equal to a $-\Delta R_2$ so that the net change in resistance of the sensor is zero and the output signal V in FIG. 1 does not change.

In FIG. 4B, the strips $R_1$ and $R_2$ are subjected to vertical magnetic field components $S_1'$ and $S_2'$ which are equal in magnitude but of opposite sense, which occurs, for example, with a vertical transition centered under the two sensor strips. As a result, the change in total resistance is $\Delta R/2$, producing the maximum output signal V shown in FIG. 1.

FIG. 5A is an enlarged view diagrammatically illustrating a magnetic transition MT and the MR strips $R_1$ and $R_2$ operating in the manner just described. FIG. 5B shows the configuration of the vertical field component $S_y$ existing about the depicted vertical transition. FIG. 5C shows the waveform of the output voltage V when the transition is moved in the X direction passing the sensor location. The waveform V is of a unimodal type similar to the waveform provided by an inductive type $d\phi/dt$ type magnetic transducer during sensing of a horizontally recorded magnetic transition. This is an advantage in that established recording channel techniques for handling signals from a inductive type magnetic transducer are well developed and well understood.

It will be appreciated that FIGS. 4A and 4B illustrate the internal differential signal processing ability of the present device which is obtained by the two terminal design of the present structure.

Any of the known thin film manufacturing processes for making MR sensors may be employed in the manufacture of the present invention. FIGS. 6A and 6B represent plan views respectively of a prior art MR sensor employing what is referred to as a four-terminal device and a MR sensor of the present invention employing what is referred to as only two terminals. It will be readily apparent to those persons skilled in the art of building multi-layer thin film devices on a substrate that the two terminal design of FIG. 6B inherently represents a less complex, less expensive manufacturing process than the design shown in FIG. 6A in which, for example, the bottom layer of the device has a separate terminal $T_1$ and the upper layer of the device has a separate terminal $T_2$ while the respective opposite ends of each strip are connected together at terminal $T_3$ which, effectively, may be one terminal or two separate terminals which are connected externally.

While the invention has been particularly shown and described with reference to a preferred embodiment thereof, it will be understood by those skilled in the art that various changes in the form and details may be made therein without departing from the spirit and scope of the invention.

Having thus described my invention, what I claim as new and desire to secure by Letters Patent is:

1. A sensor for reading binary data stored on a magnetic surface in the form of recorded flux field transitions comprising:
   a pair of thin film mutually-biased magnetoresistive strips, corresponding ends of which are interconnected to define first and second terminals, one of which is adapted to be connected to a constant current source, said strips being spaced apart in parallel relationship so that a substantially different field is sensed by each of said strips, said strips having substantially the same resistance value R, whereby the magnetoresistive strips are connected such that the current I supplied from said source splits substantially equally between said strips to cause said strips to be biased in opposite directions and at the same corresponding point in the linear region of the respective magnetoresistive curves for said strips; and
   means for obtaining an output signal V from said sensor in response to each said strip sensing magnetic flux components that have been stored on a magnetic surface and that are substantially parallel to the respective bias fields, said signal V being (1) constant when said flux components are in the same direction and of substantially the same value which results in a zero net change in the effective resistance between said terminals, and (2) variable in proportion to the algebraic difference in the respective values of said flux components to produce a unimodal signal.

2. The sensor called for in claim 1 in which said stored binary data has been vertically recorded.

3. The sensor called for in claim 1 in which said difference in the respective values of said oppositely directed flux components is differentially summed internally of said sensor.

4. The sensor called for in claim 3 further including a thin film of relatively poor conducting material separating said pair of mangetoresistive strips.

5. The sensor called for in claim 3 further including a thin film of insulating material and means are disposed at opposite ends of said strips to interconnect said strips and provide said first and second terminals.

6. The sensor called for in claim 5 in which the thickness of said separating material is relatively small compared to the spacing of adjacent vertically recorded data bits which are to be sensed.

7. A method of reading vertically recorded data stored on a magnetic surface to provide a unimodal pulse type signal at each flux field transition by means of a two terminal magnetoresistive sensing device having a pair of thin film magnetoresistive strips being spaced apart so that a substantially different field is sensed by each of said strips, said strips being disposed parallel to each other in a plane parallel to said transitions and connected between said two terminals, said method comprising the steps of:
   (1) supplying a constant current to one terminal of said device to cause current to flow through each said strip to said second terminal in equal amounts such that said strips are magnetically biased in opposite directions to corresponding points on their respective magnetoresistive curves; and
   (2) simultaneously moving said device parallel to said surface to vary the resistance of each said strip in accordance with the direction and value of vertical flux components which are sensed by each said strip whereby the net change in resistance between said first and second terminal is zero except when scanning a transition where the vertical flux components change direction and the effects of said oppositely directed vertical flux components on each said strip are differentially summed internally of said device to create a unimodal type voltage signal at said first terminal.

8. A method of sensing vertically recorded binary data stored in the form of fluid field transistions on a magnetic surface, said method comprising the steps of:
   (1) oppositely biasing a pair of magnetoresistive strips which are (a) connected in parallel between first and second terminals, and (b) spaced apart physically a distance which is relatively small compared to the recording density of said binary data on said magnetic surface so that a substantially different field is sensed by each of said strips, said biasing step including supplying to said first terminal a current I to cause a current of I/2 to flow in each strip simultaneously whereby said strips are biased in opposite directions to corresponding points on their respective magnetoresistive curves;
   (2) positioning said strips in flux sensing relationship with said magnetic surface with the plane of said strips parallel to said flux transitions defined by the vertical components of magnetic flux emanating from said surface in opposite directions;
   (3) moving said strips parallel to said surface to scan said transitions; and
   (4) simultaneously monitoring the voltage at said first terminal to provide an indication of the value of said stored binary data represented by each transition in accordance with the polarity of the unimodal voltage signal developed at said first terminal.

* * * * *